US009917817B1

(12) United States Patent
Lad et al.

(10) Patent No.: US 9,917,817 B1
(45) Date of Patent: Mar. 13, 2018

(54) SELECTIVE ENCRYPTION OF OUTGOING DATA

(71) Applicant: EMC IP Holding Company LLC, Hopkinton, MA (US)

(72) Inventors: Aditya Lad, Karnataka (IN); Anadi Madhukar, Karnataka (IN); Rajendra Pendurthy, Karnataka (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 175 days.

(21) Appl. No.: 13/913,696

(22) Filed: Jun. 10, 2013

(51) Int. Cl.
*H04L 29/06* (2006.01)

(52) U.S. Cl.
CPC .............................. *H04L 63/0428* (2013.01)

(58) Field of Classification Search
CPC . H04L 63/0876; H04L 63/0428; H04L 63/20; G06F 3/067; G06F 21/602; G06F 21/606; G06F 21/62; G06F 21/6209; G06F 2221/2107
USPC ........................................................ 713/153
See application file for complete search history.

(56) References Cited

U.S. PATENT DOCUMENTS

| | | | |
|---|---|---|---|
| 6,874,085 B1* | 3/2005 | Koo et al. ..................... 713/165 | |
| 7,505,976 B2* | 3/2009 | Kudo | |
| 8,468,244 B2* | 6/2013 | Redlich et al. ............... 709/225 | |
| 8,542,823 B1* | 9/2013 | Nguyen ................ G06F 21/602 | 380/42 |
| 8,776,249 B1* | 7/2014 | Margolin .............. G06F 21/606 | 380/277 |
| 9,015,082 B1* | 4/2015 | Jaiswal ............... G06F 21/6209 | 706/12 |
| 9,171,171 B1* | 10/2015 | Deb ........................ G06F 21/60 | |
| 2005/0198412 A1* | 9/2005 | Pedersen ............. H04L 63/0428 | 710/30 |
| 2006/0075228 A1* | 4/2006 | Black .................. H04L 63/0428 | 713/167 |
| 2006/0177061 A1* | 8/2006 | Orsini ................... G06F 21/606 | 380/268 |
| 2009/0254572 A1* | 10/2009 | Redlich .................. G06Q 10/06 | |
| 2010/0332401 A1* | 12/2010 | Prahlad ............... G06F 17/3002 | 705/80 |

OTHER PUBLICATIONS

Miller, Overview of Protected Office Open XML Documents, Microsoft Open Specifications Support Team Blog, Microsoft [online], Jul. 2009 [retrieved on Dec. 18, 2014]. Retrieved from the Internet<http://blogs.msdn.com/b/openspecification/archive/2009/07/17/overview-of-protected-office-open-xml-documents.aspx>.*

* cited by examiner

*Primary Examiner* — Minh Dinh
(74) *Attorney, Agent, or Firm* — Ryan, Mason & Lewis, LLP

(57) ABSTRACT

Methods, apparatus and articles of manufacture for selective encryption of outgoing data are provided herein. A method includes monitoring a set of outgoing data from a first user, identifying one or more items of sensitive information from the set of outgoing data, encrypting the one or more items of sensitive information to produce one or more items of encrypted sensitive information, and replacing the one or more items of sensitive information with the one or more items of encrypted sensitive information in the set of outgoing data.

20 Claims, 5 Drawing Sheets

US 9,917,817 B1

SELECTIVE ENCRYPTION OF OUTGOING DATA

FIELD

The field relates generally to cryptography, and more particularly to data encryption techniques.

BACKGROUND

Protection of potentially sensitive data presents multiple challenges. By way of illustration, consider the following example scenario. A user copies his or her data (files, messages, logs, etc.) to an external storage such as a network share, file transfer protocol (FTP), universal serial bus (USB) storage, a cloud storage service, etc. However, if the data contains potentially sensitive information (for example, credit card numbers), copying of this data might result in information leakage, payment card industry (PCI) non-compliance, etc.

Nonetheless, in many instances, the user may not wish to encrypt the entire amount of data (or large portions thereof) to protect against such potential outcomes because encryption is a resource-intensive process. Accordingly, a need exists for enabling a user to selectively encrypt portions of potentially sensitive data within larger sets of data.

SUMMARY

One or more illustrative embodiments of the present invention provide techniques for selective encryption of outgoing data.

In accordance with an aspect of the invention, a method is provided comprising the steps of: monitoring a set of outgoing data from a first user, identifying one or more items of sensitive information from the set of outgoing data, encrypting the one or more items of sensitive information to produce one or more items of encrypted sensitive information, and replacing the one or more items of sensitive information with the one or more items of encrypted sensitive information in the set of outgoing data.

The data encryption and/or tokenization techniques of the illustrative embodiments overcome one or more of the problems associated with the conventional techniques described previously, and provide the ability for a user to selectively encrypt portions of potentially sensitive data within a larger set of data. These and other features and advantages of the present invention will become more readily apparent from the accompanying drawings and the following detailed description.

DETAILED DESCRIPTION

As will be described, the present invention, in one or more illustrative embodiments, provides techniques for selective tokenization (also referred to herein as encryption) of outgoing sensitive data.

Illustrative embodiments of the present invention will be described herein with reference to exemplary communication systems and associated processing devices. It is to be appreciated, however, that the invention is not restricted to use with the particular illustrative system and device configurations shown. For example, such devices are intended to be construed broadly so as to encompass any type of processing device that incorporates cryptographic functionality (such as a computer, server, mobile telephone, radio-frequency identification (RFID) tag or reader, authentication token, etc.).

Additionally, authentication information, as used herein, is intended to include passwords, passcodes, answers to life questions, or other authentication credentials, or values derived from such authentication credentials, or more generally any other information that a user may be required to submit in order to obtain access to an access-controlled application.

As described herein, at least one embodiment of the invention includes providing a mechanism by which sensitive (or potentially sensitive) data within larger data sets or files can be selectively encrypted (also referred to herein as tokenized) before the data files leave the user's end-point, and thus rendered secure from unauthorized access. By way merely of example and not limitation, sensitive data might include credit card numbers, social security numbers, account numbers, user-defined data, internal internet protocol (IP) addresses, log-in user-names, passwords, etc.

Figure 1:
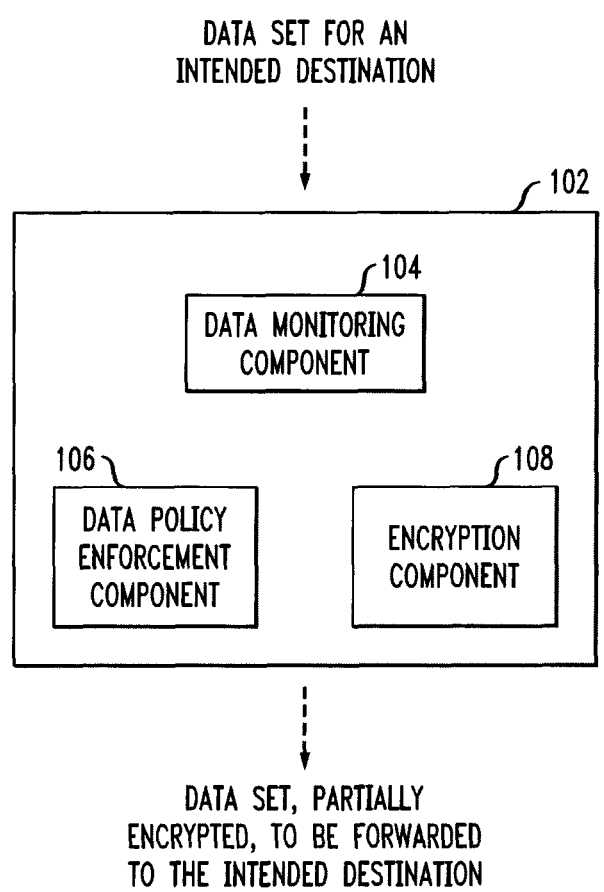
FIG. 1 is a block diagram illustrating an example system implementation according to an embodiment of the invention.

FIG. 1 is a block diagram illustrating an example system implementation according to an embodiment of the invention. By way of illustration, FIG. 1 depicts a selective encryption system 102, which includes a data monitoring component 104, a data policy enforcement component 106 and an encryption component 108. As described herein, the interception system 102 can be implemented within a communication device or analogous device or apparatus (such as a computer, server, mobile telephone, tablet, etc.). Additionally, as further detailed herein, the interception system 102 monitors (via data monitoring component 104) data emitted from a user for potentially sensitive data or material contained therein, and subsequently analyzes any identified potentially sensitive data against one or more security or classification policies (via data policy enforcement component 106). Based on such analysis, the system 102 selectively encrypts (via encryption component 108) any identified sensitive data prior to forwarding the entire data set, including the encrypted portion, to the intended destination (such as, for example, a USB storage component or a cloud based storage service).

At least one embodiment of the invention includes implementation of an integrated application that monitors outgoing data from a sender (or user) for any sensitive information, and subsequently intercepts and encrypts such sensitive data prior to emitting the data from the sender's end-point. In at least one embodiment of the invention, the definition of what constitutes sensitive data can be determined by relevant data loss prevention (DLP) policies in the form of content blades.

As used herein, a content blade encapsulates rules and logic dedicated to accurately detecting a specific piece of content, such as, for example, a Social Security number, a credit card number or a driver's license number. Additionally, a content blade uses techniques for describing content via linguistic evidence. As described herein, a content blade uses detection rules and contextual rules. Detection rules include rules, for example, that answer a question such as, "What is in the documents or transmissions?" If the document contains a personal identification number, the document might be sensitive. The context rules leverage the contextual evidence and answer a question such as, "How does the evidence appear in the documents?" Additionally, if the document contains a personal identification number, is the number near a name or an address? Once defined, the content blade can be re-used across any number of policies.

Further, detection rules in a content blade are grouped into inclusion rules and exclusion rules. Inclusion rules include positive detection rules, meaning that such rules describe evidence that should be contained in a document. Inclusion rules can be required "Must Occur" rules or optional "May Occur" rules. Exclusion rules are negative detection rules, meaning that such rules describe evidence that should not be contained in a document. These rules may be referred to as "Should Not Occur" rules. Exclusion rules, in at least one embodiment of the invention, are not used alone, but are used in conjunction with inclusion rules. Exclusion rules are used to eliminate matching on specific evidence that is causing a false positive match. The matches to exclusion rules are compared to the matches of inclusion rules, and if the total score is higher for the exclusion rules, the document in question will not be a match to the content blade. For example, an exclusion rule may be used to stop falsely matching a training document on credit card numbers, which contains valid card numbers and words and phrases. The exclusion rule may discount the document as a match based on the document's title or other linguistic evidence.

Additionally, in at least one embodiment of the invention, the full content (that is, the larger set of data including the selectively encrypted portion), when imported back to the user's end-point, can require selective decryption (de-tokenization) of the sensitive data that was selectively encrypted so as to allow the sensitive data to be read and/or accessed by intended and/or authorized recipients. As used herein, an end-point refers to the device used by the user to access data. This can include, as noted herein, a user laptop, a desktop computer, a mobile device etc. By way of illustration, consider an example scenario wherein a customer or user wishes to upload log files to an FTP location but also wishes to ensure that any sensitive data (such as user name, passwords, internal IP addresses, etc.) are secured and/or encrypted, and also wishes that only authorized support personnel have access to decrypt said sensitive data.

With respect to the noted authorized recipient above, in at least one embodiment of the invention, a data protection manager (DPM) agent present on the end-point on which the data is imported requests the DPM server to decrypt/de-tokenize the data. While doing so, the DPM agent provides additional information to the DPM server, which includes authentication information of the user who is authorized to see and/or access the data. The DPM server then checks within its database to determine if the user, as identified and reported by the DPM agent, is authorized to access the data in decrypted/de-tokenized form. The DPM server provides the decrypted/de-tokenized data only after it (that is, the DPM server) has ascertained that the user reported by DPM agent is authorized to see the decrypted/de-tokenized data.

There are various ways of identifying a user for authorization. For example, the user currently logged-on to the device can be identified using information already available with the operating system. Alternatively, the users may be asked to authenticate themselves using a username and password combination or username, password and passcode combination, or any other mechanism of authentication. Also, in at least one embodiment of the invention, users are authorized based on their presence in particular user groups in the DPM server.

Another example scenario can include wherein a user is sending a message (for example, an email) containing credit card numbers. In connection with at least one embodiment of the invention, the numbers are automatically encrypted in the outgoing message and are decrypted successfully only when the intended and/or authorized recipient views the message. Additionally, in yet another example scenario, a cloud client may wish to monitor outgoing data for any sensitive details and subsequently tokenize such sensitive data because the client may not want the cloud storage provider to scan personal data for monetary and/or advertising benefits.

As detailed herein, at least one embodiment of the invention includes integrating a DLP solution (for example, using a DLP agent) and an encryption solution (for example, using a DPM client and server) to encrypt identified sensitive data before such data leaves a user's end-point. For example, a DLP feature for discovery and monitoring capability of sensitive data (such as credit card numbers) can be combined with a DPM feature of securing sensitive data at the end-point by tokenization. The sensitive data is detected at the end-point using the DLP agent and an integrated application with the DPM agent, which subsequently encrypts and/or tokenizes the detected data with the DPM server. The receiver of this tokenized data can include, in an example embodiment of the invention, a registered user of the DPM that is authorized to decrypt the data.

With respect to the detection process noted above and additionally detailed herein, the DLP agent includes capabilities of intercepting data that is exiting the system while being saved on universal serial bus (USB) devices, being sent out as emails, being uploaded to the cloud, etc. The DLP agent accomplishes this through a signed kernel module that injects a dynamic link library (DLL) into all processes running on the system. The injected DLL, in turn, is responsible for intercepting system-level application programming interface (API) calls made by the application to monitor the applications for actions leading to data being leaked out.

The intercepted operation is then associated with the data being sent out of the system. Also, DLP uses existing content blades to identifying any sensitive portion of the data being sent out. The file containing sensitive data is then provided to the integrated encryption and/or tokenization agent, along with the location of the sensitive data in the file. The encryption and/or tokenization agent sends the data to the DPM server, which encrypts the data and stores the encrypted/tokenized data along with the decrypted plain text data in its database, the former being the key to retrieve back the plain text data when needed.

The encrypted/tokenized data is then sent back to the encryption/tokenization agent on the end-point, which replaces the original plain text sensitive data with the encrypted/tokenized data. The encryption/tokenization agent may be configured to append and/or prepend an identifier to the tokenized/encrypted data to detect its presence and location in an incoming document.

By way of example, consider a scenario wherein user systems are configured to upload backups to a remote FTP server daily. The user, in such a scenario, may not want to encrypt the entirety of data daily, but rather, the user may wish to only encrypt select portions of the data (for example, portions that are deemed sensitive). In such a scenario, an example embodiment of the invention might include incorporating a DLP-DPM integrated solution as a standalone application client. Further, the owner of the FTP server and the noted user would be the registered users of the DPM solution.

The capabilities supported by DLP include the ability to monitor data in motion via analyzing network protocols, the ability to monitor data at rest via analyzing data saved in network shares, and the capability to monitor data in use via analyzing files being saved to a USB, network drives, cloud storage etc. The capabilities also include an ability to locate the exact location of sensitive data and/or text in files of supported format. Additionally, at least one embodiment of the invention includes integration with cloud agents, and also includes support of and/or for various file formats, wherein outgoing data can be discovered by a DLP solution and subsequently secured by a DPM tokenization solution, while the incoming data from the cloud can be de-tokenized via a procedure that remains out of sight from the user.

Incoming data from the cloud can be intercepted by an agent running on the system in a similar fashion as outgoing data. This incoming data can be checked for the presence of relevant identifiers which were added to the data while it was encrypted and/or tokenized. The encrypted/tokenized data, after being identified with the identifier, is provided to the encryption/tokenization agent for decryption/de-tokenization. This encrypted/tokenized data is sent to DPM server, which fetches the original plain text data behind this encrypted/tokenized data from the database. This plain text data is then replaced in the incoming document.

Figure 2:
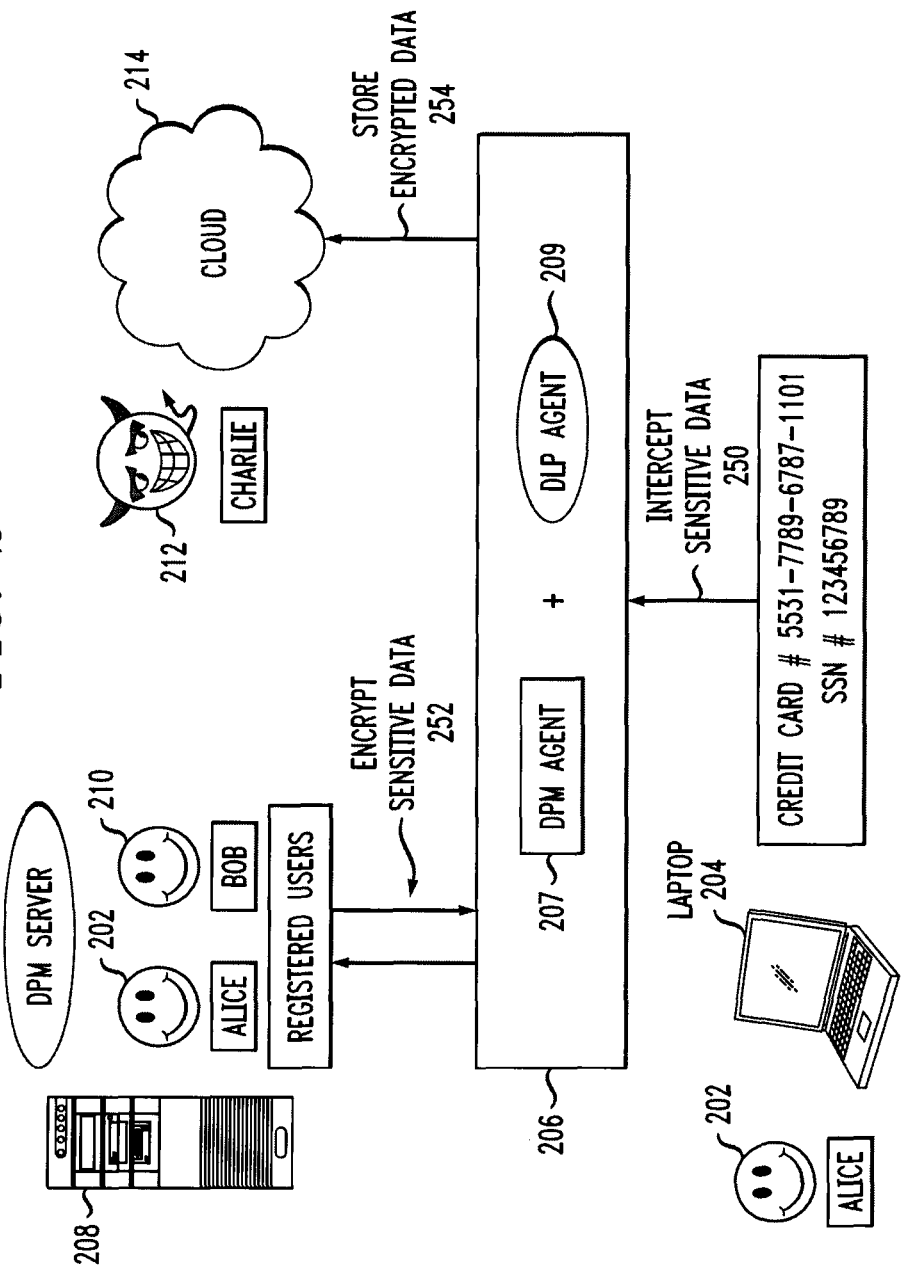
FIG. 2 is a diagram illustrating identification of sensitive data and subsequent encryption and storage of said data on a device, according to an embodiment of the invention.

FIG. 2 is a diagram illustrating identification of sensitive data and subsequent encryption and storage of said data on a device (the cloud, for example), according to an embodiment of the invention. By way of illustration, FIG. 2 depicts a first user 202 (referred to herein as Alice), a second user 210 (referred to herein as Bob) and a third user 212 (referred to herein as Charlie). As depicted in FIG. 2, Alice 202 has access to and/or operates with a laptop 204. Additionally, FIG. 2 depicts a DLP and DPM integrated application 206, which includes a DPM agent 207 and a DLP agent 209. Further, FIG. 2 depicts a DPM server 208, of which Alice 202 and Bob 210 are registered users, and the cloud 214.

As also depicted in FIG. 2, in step 250, the DLP and DPM integrated application 206 intercepts sensitive data (such as credit card numbers, social security numbers, etc.) output from the laptop 204 of Alice 202. As detailed herein, the DLP agent is designed to monitor applications by intercepting system level API calls made by the application. The DLP agent can hence look at an intercepted API call, even before it is completed, made by an application and determine whether this particular call involves data going out of the machine (for example, saving to USB, email or cloud). The DLP agent can also determine or identify the data involved in this transfer by associating the API call with a file, which can be an argument to the intercepted API call. This data can be classified using content blades already available with the DLP agent. The presence and location of sensitive data in the document being sent out of the machine can additionally be identified.

In step 252, DLP and DPM integrated application 206 encrypts (tokenizes) the intercepted sensitive data using the DPM server 208. In the case of encryption, the user can choose a symmetric key encryption algorithm, its mode and key size depending on the symmetric key encryption schemes implemented. Strong key sizes can be selected for better encryption capabilities, as provided by the integration. The keys would be provided by DPM server and the integration point would carry out the encryption (and decryption). For tokenization, the DPM server itself would return a random token, and there would not be an additional encryption. Further, in step 254, the encrypted data is stored on a third party storage provider such as cloud 214.

By way of further illustration of the components and steps depicted in FIG. 2, consider the following example use case. As a user, Alice 202 wants to store a set of data on a storage provider such as cloud 214. Alice has an application (that is, application 206) running in the background of the operations of her laptop 204, and the application 206 includes an integration of a DLP agent 209 and a DPM agent 207.

The DLP agent and the DPM tokenization/encryption agent can be installed on the same machine. Additionally, the policy of the DLP agent can be configured to flag or identify files containing certain content (as described in applicable content blades) as sensitive, to consider movement of such files to outside of the machine as a policy violation, and to trigger a customized action in response to a policy violation. The customized action can invoke the DPM agent with the file name and location of sensitive data as input. The DPM agent can also use the DPM server to tokenize/encrypt the data as applicable.

Within the application 206, the DLP agent 209 monitors outgoing data for any sensitive information, for example, as defined by DLP policies, and the DLP agent 209 additionally filters out any identified sensitive data or information within Alice's set of data. In at least one embodiment of the invention, when the DLP agent 209 intercepts sensitive outgoing data (for example, outgoing data directed towards the storage provider 214), the integrated application 206 triggers a mechanism to filter out the intercepted sensitive data and tokenizes or encrypts the intercepted sensitive data using the DPM agent 207.

The resulting outgoing data (that is, the intercepted data from the original set of data output by the user (Alice) that has been deemed sensitive) is thus converted into an encrypted form of data which can only be accessed and/or read by authorized agents of DPM, thereby protecting that portion of data from being accessed by unauthorized users (such as, for example, Charlie 212 in FIG. 2). Moreover, as detailed herein, only the identified/intercepted sensitive portion of the outgoing set of data is encrypted or tokenized. By way of example, if a text line within the set of data reads: "My credit card number is 4111 1111 1111 1111," that line of text can be encrypted via conversion to "My credit card number is 79097092943546342343," without requiring additional resources for encrypting other portions (or possibly the balance) of the outgoing set of data.

Further, in at least one embodiment of the invention, when another authorized user (such as Bob 210), retrieves the set of data from the storage provider 214, that authorized user can utilize the DPM agent 207 in the integrated application 206 to decrypt/de-tokenize the previously encrypted data.

Figure 3:
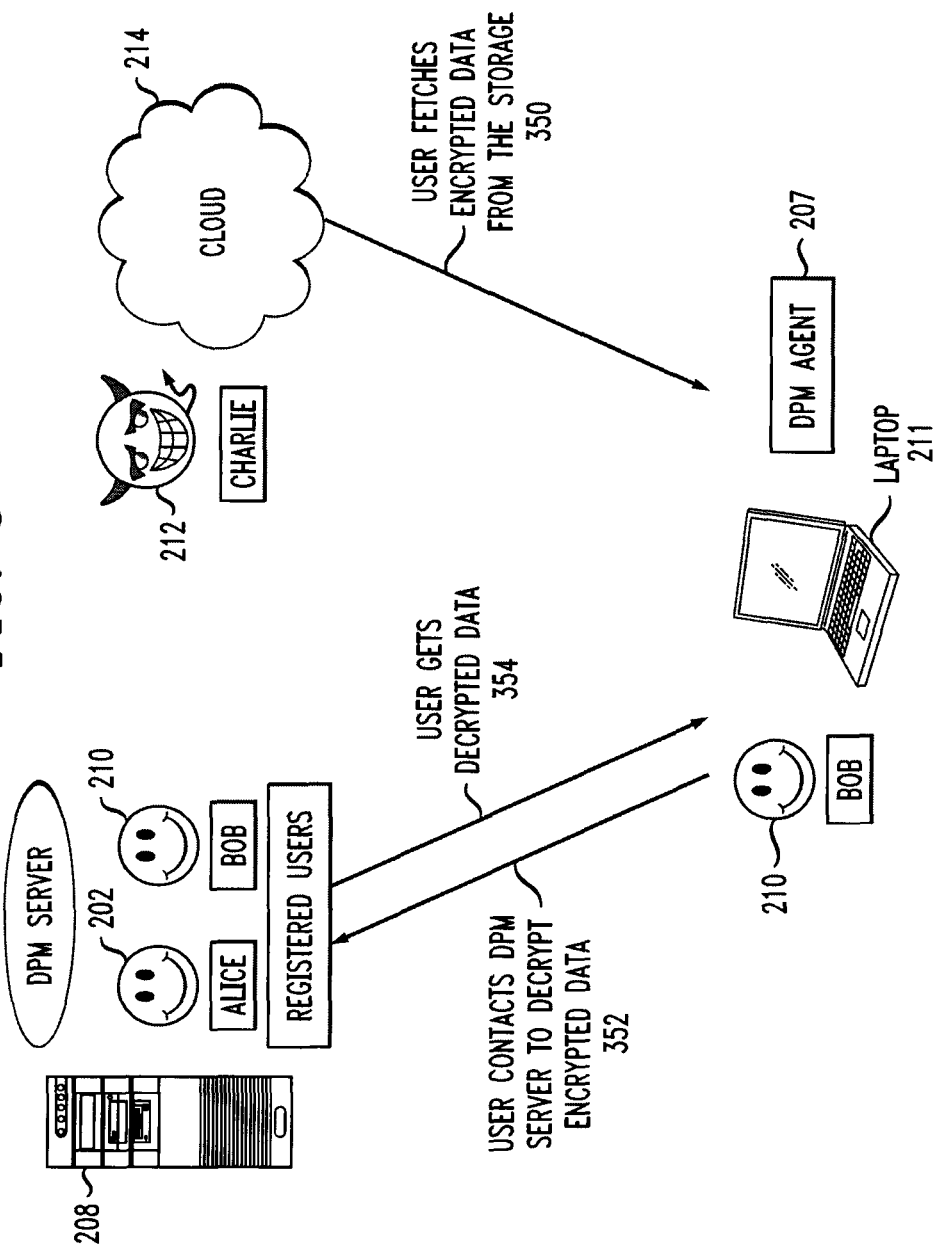
FIG. 3 is a diagram illustrating retrieval of encrypted data from the cloud by an authorized user and subsequent decryption of said data, according to an embodiment of the invention.

Accordingly, FIG. 3 is a diagram illustrating retrieval of encrypted data from the cloud by an authorized user and subsequent decryption of said data, according to an embodiment of the invention. By way of illustration, FIG. 3 depicts, similarly to FIG. 2, user Alice 202, user Bob 210 and user Charlie 212. As depicted in FIG. 3, Bob 210 has access to and/or operates with a laptop 211, which can utilize the DPM agent 207 (in the integrated application 206). Additionally, FIG. 3 depicts DPM server 208, of which Alice 202 and Bob 210 are registered users, and the cloud (storage provider) 214.

As also depicted in FIG. 3, in step 350, user Bob 210 fetches the encrypted data (as detailed in connection with FIG. 2) from the storage provider 214. Additionally, in step 352, Bob 210 communicates with the DPM server 208 to decrypt the encrypted data via DPM agent 207 in the integrated application 206, and in step 354, Bob 210 receives the decrypted data (in addition to the balance of the original data set that was not encrypted).

The users Bob and Alice are added to the DPM server while configuring the encryption/tokenization policies. The users may be identified by the DPM agent via multiple ways, such as, for example, by associating the user logged-in to the operating system with a particular user in the DPM server, or by asking the user to authenticate him or herself via a username and password combination, or a username, password and passcode combination, or any other mechanism of authentication. The users can also be authenticated based on their presence in a particular group, the group being defined in the DPM server.

Figure 4:
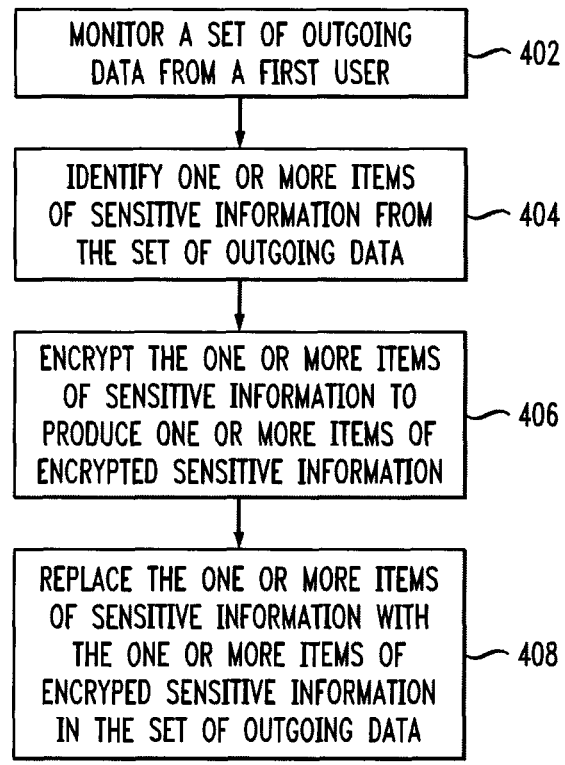
FIG. 4 is a flow diagram illustrating techniques according to an embodiment of the invention.

FIG. 4 is a flow diagram illustrating techniques according to an embodiment of the present invention. Step 402 includes monitoring a set of outgoing data from a first user. Step 404 includes identifying one or more items of sensitive information from the set of outgoing data. The identifying step can include identifying one or more items of sensitive information defined by a data loss prevention policy (implemented via one or more content blades, for example). As detailed herein, items of sensitive information can include, for example, a credit card number, a social security number, an account number, user-defined data, an internal internet protocol address, a log-in user-name, and/or a password.

Step 406 includes encrypting the one or more items of sensitive information to produce one or more items of encrypted sensitive information. In at least one embodiment of the invention, encrypting can include implementing a data protection manager agent, implementing a symmetric key encryption algorithm, etc. Step 408 includes replacing the one or more items of sensitive information with the one or more items of encrypted sensitive information in the set of outgoing data.

As detailed herein, outgoing data includes data that is leaving/exiting a machine (a laptop, for example) and is en route to being stored in a third party (external) storage system such as USB, FTP, or the cloud. As depicted in FIG. 4 and additionally described herein, this data is intercepted and analyzed before it is stored on the third party storage system (or before the set of outgoing data is transmitted to an intended target), and the items of sensitive information are identified in this data and encrypted to produce encrypted sensitive information.

The techniques depicted in FIG. 4 can additionally include authenticating a second user to retrieve the one or more items of encrypted sensitive information. Authenticating the second user can include, for example, using a username and password combination, using username, password and passcode combination, and/or confirming presence of the second user in a particular authorized (DPM) user group. Further, the techniques depicted in FIG. 4 can also include decrypting the one or more items of encrypted sensitive information and providing the one or more items of decrypted sensitive information to the second user.

Additionally, at least one embodiment of the invention includes identifying one or more items of sensitive information from a set of outgoing data from a first user, encrypting the one or more items of sensitive information to produce one or more items of encrypted sensitive information, and replacing the one or more items of sensitive information with the one or more items of encrypted sensitive information in the set of outgoing data. Such an embodiment of the invention further includes decrypting the one or more items of encrypted sensitive information, and providing the one or more items of decrypted sensitive information to an authorized second user.

Techniques of the type described herein may be implemented in a wide variety of different applications. An additional exemplary communication system application that may incorporate such techniques will now be described with reference to FIG. 5.

Figure 5:
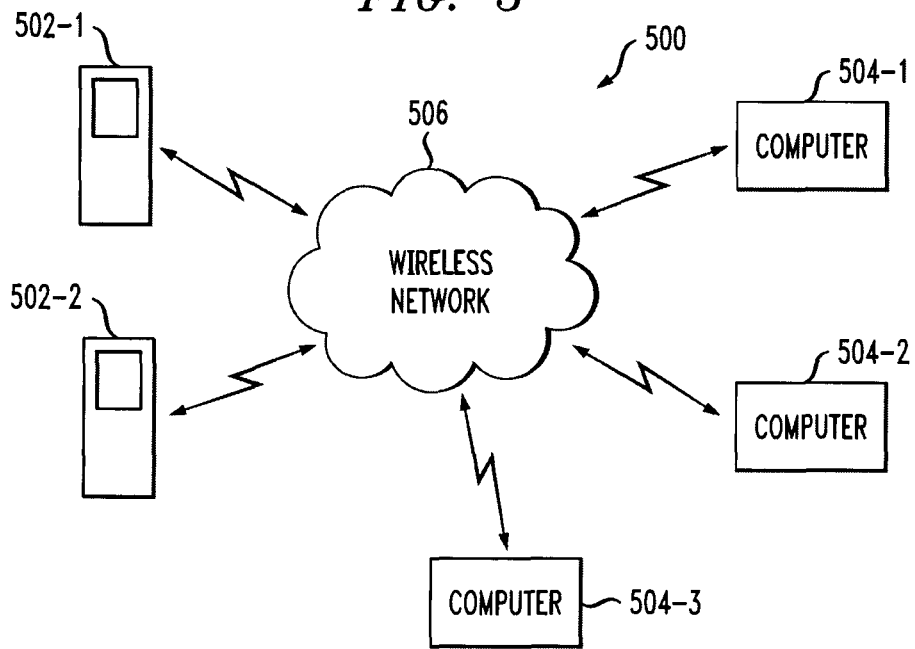
FIG. 5 shows an exemplary embodiment of another communication system that may incorporate functionality of the type illustrated in at least one embodiment of the invention.

Referring to FIG. 5, a communication system 500 comprises a plurality of mobile telephones 502-1 and 502-2 and computers 504-1, 504-2 and 504-3, configured to communicate with one another over a network 506.

Any two or more of the devices 502 and 504 may correspond to cryptographic devices configured to implement at least one embodiment of the invention (such as, for example, selective encryption system 102), as previously described. It is to be appreciated that the techniques disclosed herein can be implemented in numerous other applications.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/ acts specified in the flowchart and/or block diagram block or blocks.

The flowchart(s) and block diagram(s) in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 6:
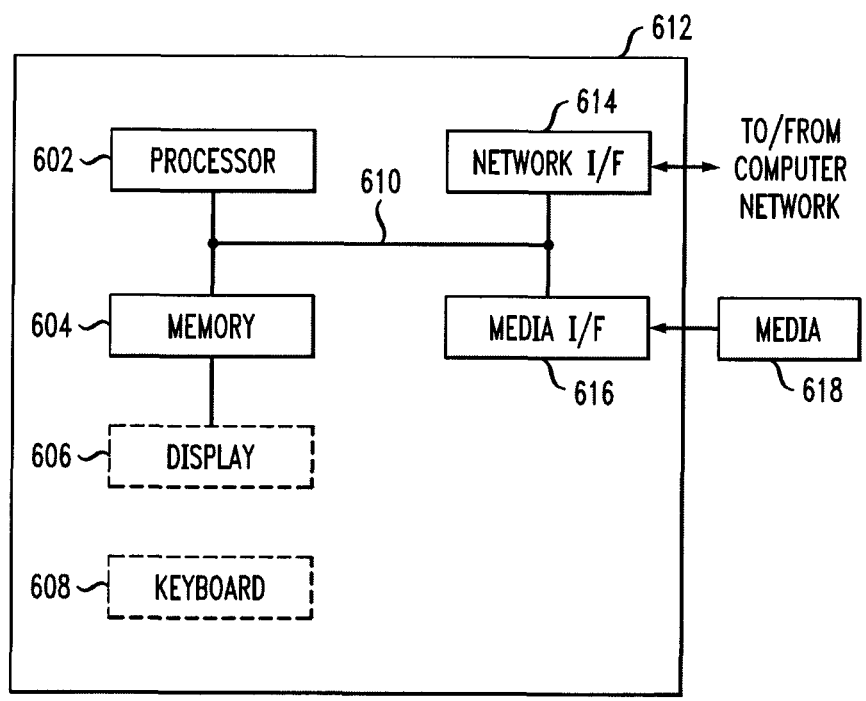
FIG. 6 is a system diagram of an exemplary computer system on which at least one embodiment of the invention can be implemented.

By way of example, an aspect of the present invention can make use of software running on a general purpose computer. As noted above, FIG. 6 is a system diagram of an exemplary computer system on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 602, memory 604, and input/output interface such as display 606 and keyboard 608 can be interconnected, for example, via bus 610 as part of a data processing unit 612 such as, for example, selective encryption system 102). Suitable interconnections via bus 610, can also be provided to a network interface 614 (such as a network card), which can be provided to interface with a computer network, and to a media interface 616 (such as a diskette or compact disc read-only memory (CD-ROM) drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening I/O controllers.

Network adapters such as network interface 614 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 612 as depicted in FIG. 6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and cryptographic devices that can benefit from data encryption techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
monitoring a set of outgoing data generated by a first user via a user computing device, wherein said monitoring is carried out, prior to transmission of the set of outgoing data from the user computing device, by a data monitoring agent executing in the background of operations of the user computing device;
identifying one or more items of sensitive information from the set of outgoing data, wherein said identifying is carried out, prior to transmission of the set of outgoing data from the user computing device, by a data policy enforcement agent executing in the background of operations of the user computing device, and wherein said identifying comprises:
 implementing, via one or more content blades, one or more data loss prevention policies against the set of outgoing data, wherein the data loss prevention policies define items of sensitive information, and wherein the one or more content blades encapsulate one or more detection rules and one or more contextual rules related to identifying items of sensitive information, wherein:
 the detection rules comprise (i) one or more inclusion rules, which describe items of information that should be contained in outgoing data, and (ii) one or more exclusion rules, which describe items of information that should not be contained in outgoing data, wherein said implementing the one or more data loss prevention policies comprises:
  comparing (i) the number of matches between the one or more exclusion rules and the outgoing data and (ii) the number of matches between the one or more inclusion rules and the outgoing data;
  determining, based on said comparing, the outgoing data to be a false positive match with the detection rules upon a determination that the number of matches between the one or more exclusion rules and the outgoing data exceeds the number of matches between the one or more inclusion rules and the outgoing data; and
  precluding use of one or more of the content blades upon a determination that the outgoing data is a false positive match with the detection rules; and
 the contextual rules describe proximity parameters for defined items of sensitive information with respect to one or more predetermined categories of information items;
selectively encrypting a sub-set of the set of outgoing data, wherein the sub-set consists of the one or more identified items of sensitive information, to produce one or more items of encrypted sensitive information, wherein said encrypting is carried out, prior to transmission of the set of outgoing data from the user computing device, by an encryption agent executing in the background of operations of the user computing device; and
replacing the one or more items of sensitive information with the one or more items of encrypted sensitive information in the set of outgoing data to produce a version of the set of outgoing data that comprises (i) the encrypted sub-set of the outgoing data and (ii) one or more unencrypted sub-sets of the outgoing data, wherein said replacing is carried out, prior to transmission of the set of outgoing data from the user computing device, by the encryption agent executing in the background of operations of the user computing device.

2. The method of claim 1, wherein said one or more items of sensitive information comprises at least one of a credit card number, a social security number, an account number, user-defined data, an internal internet protocol address, a log-in user-name, and a password.

3. The method of claim 1, wherein said selectively encrypting comprises implementing a data protection manager agent.

4. The method of claim 1, wherein said selectively encrypting comprises implementing a symmetric key encryption algorithm.

5. The method of claim 1, wherein said replacing comprises replacing the one or more items of sensitive information with the one or more items of encrypted sensitive information in the set of outgoing data before the set of outgoing data is stored in a third party storage system.

6. The method of claim 1, wherein said replacing comprises replacing the one or more items of sensitive information with the one or more items of encrypted sensitive information in the set of outgoing data before the set of outgoing data is transmitted to an intended target.

7. The method of claim 1, comprising:
authenticating a second user to retrieve the one or more items of encrypted sensitive information.

8. The method of claim 7, wherein said authenticating comprises using a username and password combination.

9. The method of claim 7, wherein said authenticating comprises using username, password and passcode combination.

10. The method of claim 7, wherein said authenticating comprises confirming a presence of the second user in a particular authorized user group.

11. The method of claim 7, comprising:
decrypting the one or more items of encrypted sensitive information.

12. The method of claim 7, comprising:
providing the one or more items of decrypted sensitive information to the second user.

13. An article of manufacture comprising a non-transitory processor-readable storage medium having processor-readable instructions tangibly embodied thereon which, when implemented, cause a processor to carry out the steps of the method of claim 1.

14. An apparatus comprising:
a memory; and
at least one processor coupled to the memory and configured to:
monitor a set of outgoing data generated by a first user prior to transmission of the set of outgoing data;
identify one or more items of sensitive information from the set of outgoing data prior to transmission of the set of outgoing data, wherein said identifying comprises:
implementing, via one or more content blades, one or more data loss prevention policies against the set of outgoing data, wherein the data loss prevention policies define items of sensitive information, and wherein the one or more content blades encapsulate one or more detection rules and one or more contextual rules related to identifying items of sensitive information, wherein:
the detection rules comprise (i) one or more inclusion rules, which describe items of information that should be contained in outgoing data, and (ii) one or more exclusion rules, which describe items of information that should not be contained in outgoing data, wherein said implementing the one or more data loss prevention policies comprises:
comparing (i) the number of matches between the one or more exclusion rules and the outgoing data and (ii) the number of matches between the one or more inclusion rules and the outgoing data;
determining, based on said comparing, the outgoing data to be a false positive match with the detection rules upon a determination that the number of matches between the one or more exclusion rules and the outgoing data exceeds the number of matches between the one or more inclusion rules and the outgoing data; and
precluding use of one or more of the content blades upon a determination that the outgoing data is a false positive match with the detection rules; and
the contextual rules describe proximity parameters for defined items of sensitive information with respect to one or more predetermined categories of information items;
selectively encrypt a sub-set of the set of outgoing data, wherein the sub-set consists of the one or more identified items of sensitive information, to produce one or more items of encrypted sensitive information prior to transmission of the set of outgoing data; and
replace the one or more items of sensitive information with the one or more items of encrypted sensitive information in the set of outgoing data, prior to transmission of the set of outgoing data, to produce a version of the set of outgoing data that comprises (i) the encrypted sub-set of the outgoing data and (ii) one or more unencrypted sub-sets of the outgoing data.

15. The apparatus of claim 14, wherein said replacing comprises replacing the one or more items of sensitive information with the one or more items of encrypted sensitive information in the set of outgoing data before the set of outgoing data is stored in a third party storage system.

16. The apparatus of claim 14, wherein the at least one processor is further configured to:
authenticate a second user to retrieve the one or more items of encrypted sensitive information.

17. The apparatus of claim 14, wherein the at least one processor is further configured to:
decrypt the one or more items of encrypted sensitive information.

18. A method comprising:
identifying one or more items of sensitive information from a set of outgoing data generated by a first user via a first computing device, wherein said identifying is carried out, prior to transmission of the set of outgoing data from the first computing device, by a data policy enforcement agent executing in the background of operations of the first computing device, and wherein said identifying comprises:
implementing, via one or more content blades, one or more data loss prevention policies against the set of outgoing data, wherein the data loss prevention policies define items of sensitive information, and wherein the one or more content blades encapsulate one or more detection rules and one or more contextual rules related to identifying items of sensitive information, wherein:
the detection rules comprise (i) one or more inclusion rules, which describe items of information that should be contained in outgoing data, and (ii) one or more exclusion rules, which describe items of information that should not be contained in outgoing data, wherein said implementing the one or more data loss prevention policies comprises:
  comparing (i) the number of matches between the one or more exclusion rules and the outgoing data and (ii) the number of matches between the one or more inclusion rules and the outgoing data;
  determining, based on said comparing, the outgoing data to be a false positive match with the detection rules upon a determination that the number of matches between the one or more exclusion rules and the outgoing data exceeds the number of matches between the one or more inclusion rules and the outgoing data; and
  precluding use of one or more of the content blades upon a determination that the outgoing data is a false positive match with the detection rules; and
  the contextual rules describe proximity parameters for defined items of sensitive information with respect to one or more predetermined categories of information items;
selectively encrypting a sub-set of the set of outgoing data, wherein the sub-set consists of the one or more identified items of sensitive information, to produce one or more items of encrypted sensitive information, wherein said encrypting is carried out, prior to transmission of the set of outgoing data from the first computing device, by an encryption agent executing in the background of operations of the first computing device;
replacing the one or more items of sensitive information with the one or more items of encrypted sensitive information in the set of outgoing data to produce an updated version of the set of outgoing data that comprises (i) the encrypted sub-set of the outgoing data and (ii) one or more unencrypted sub-sets of the outgoing data, wherein said replacing is carried out, prior to transmission of the set of outgoing data from the first computing device, by the encryption agent executing in the background of operations of the first computing device;
decrypting the one or more items of encrypted sensitive information from the updated version of the set of outgoing data, wherein said decrypting is carried out by an decryption component executing within a second computing device; and
providing the one or more items of decrypted sensitive information to an authorized second user, wherein said providing is carried out by a component executing within the second computing device.

19. The method of claim 18, comprising:
authenticating the second user to retrieve the one or more items of encrypted sensitive information.

20. The method of claim 19, wherein said authenticating comprises at least one of (i) using a username and password combination, and (ii) confirming a presence of the second user in a particular authorized user group.

* * * * *